United States Patent [19]
Chen

[11] Patent Number: 5,793,464
[45] Date of Patent: Aug. 11, 1998

[54] EYEGLASSES FRAME

[76] Inventor: Chin-Lung Chen, 9F3R, No. 210, Chung Hsueh Rd., Tainan, Taiwan

[21] Appl. No.: 795,758

[22] Filed: Feb. 6, 1997

[51] Int. Cl.$^6$ .............................. G02C 5/14; G02C 11/02
[52] U.S. Cl. .......................... 351/116; 351/121; 351/153; 351/51; 16/228
[58] Field of Search ........................ 351/111, 116, 351/119, 121, 153, 51; 16/228

[56] References Cited

U.S. PATENT DOCUMENTS

| | | | |
|---|---|---|---|
| 3,633,243 | 1/1972 | Dietrich et al. | 351/153 |
| 4,998,815 | 3/1991 | Lin | 351/121 |
| 5,596,789 | 1/1997 | Simioni | 351/153 |

FOREIGN PATENT DOCUMENTS 2103829  2/1983  United Kingdom ............ 351/116

*Primary Examiner*—Huy Mai

[57] ABSTRACT

Eyeglasses includes a lens frame, two temples and two connecters for connecting the lens frame with the temples. The lens frame has a slot in each of two side ends to fit firmly with an intermediate small wall of a connecter between two parallel walls, and each temple is pivotally connected with each connecter. Then the lens frame and the two temples are indirectly assembled with each other, and easy to be altered for changing an outer appearance of the eyeglasses.

1 Claim, 7 Drawing Sheets

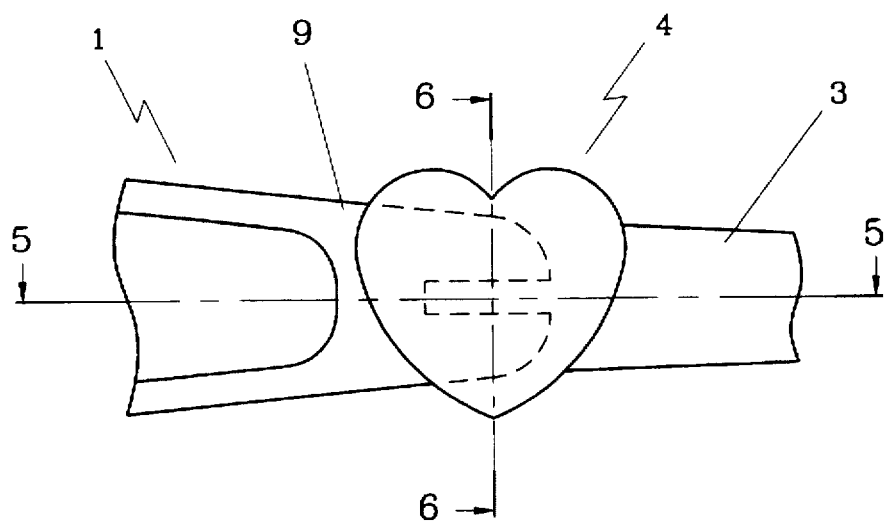
FIG 4
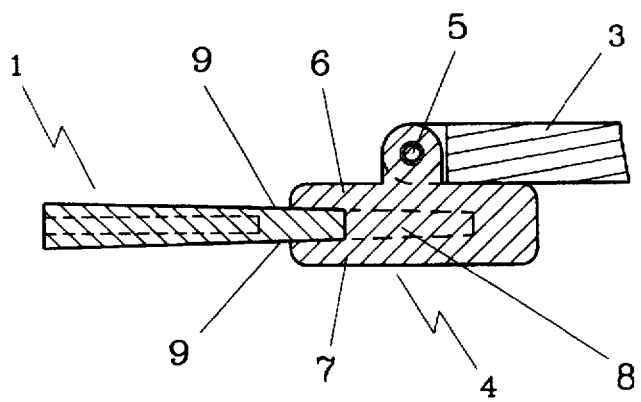 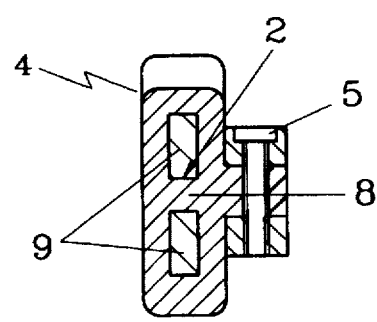
FIG 5 FIG 6

5,793,464

EYEGLASSES FRAME

BACKGROUND OF THE INVENTION

This invention relates to eyeglasses frame, particularly to those having a lens frame and two temples easily changeable.

A known conventional eyeglasses shown in FIG. 1, includes a lens frame A and two temples B directly and pivotally connected with two side ends of the lens frame A with no decorative effect.

SUMMARY OF THE INVENTION

The purpose of the invention is to offer eyeglasses with a lens frame and two temples changeable so as to permit eyeglasses change its decorative appearance.

A feature of the invention is a slot provided respectively in two side ends of a lens frame, and a connecter respectively connected between the lens frame and each temple. The connecter is pivotally connected with the temple, having two parallel walls connected with an intermediate small wall and an opening formed between the two walls. The slot of the lens frame firmly fits with the intermediate small wall, and the two walls of the connecter clamp a side end wall of the lens frame so that the lens frame and each temple may be indirectly assembled together with the connecter. The lens frame and the two temples can be altered easily.

BRIEF DESCRIPTION OF DRAWINGS

This invention will be better understood by referring to the accompanying drawings, wherein:

FIG. 4 is a front view of the first preferred embodiment of eyeglasses frame in the present invention;

FIG. 5 is a cross-sectional view of 5—5 line in FIG. 4.

FIG. 6 is a cross-sectional view of 6—6 line in FIG. 4.

DESCRIPTION OF THE PREFERRED EMBODIMENTS

Figure 1:
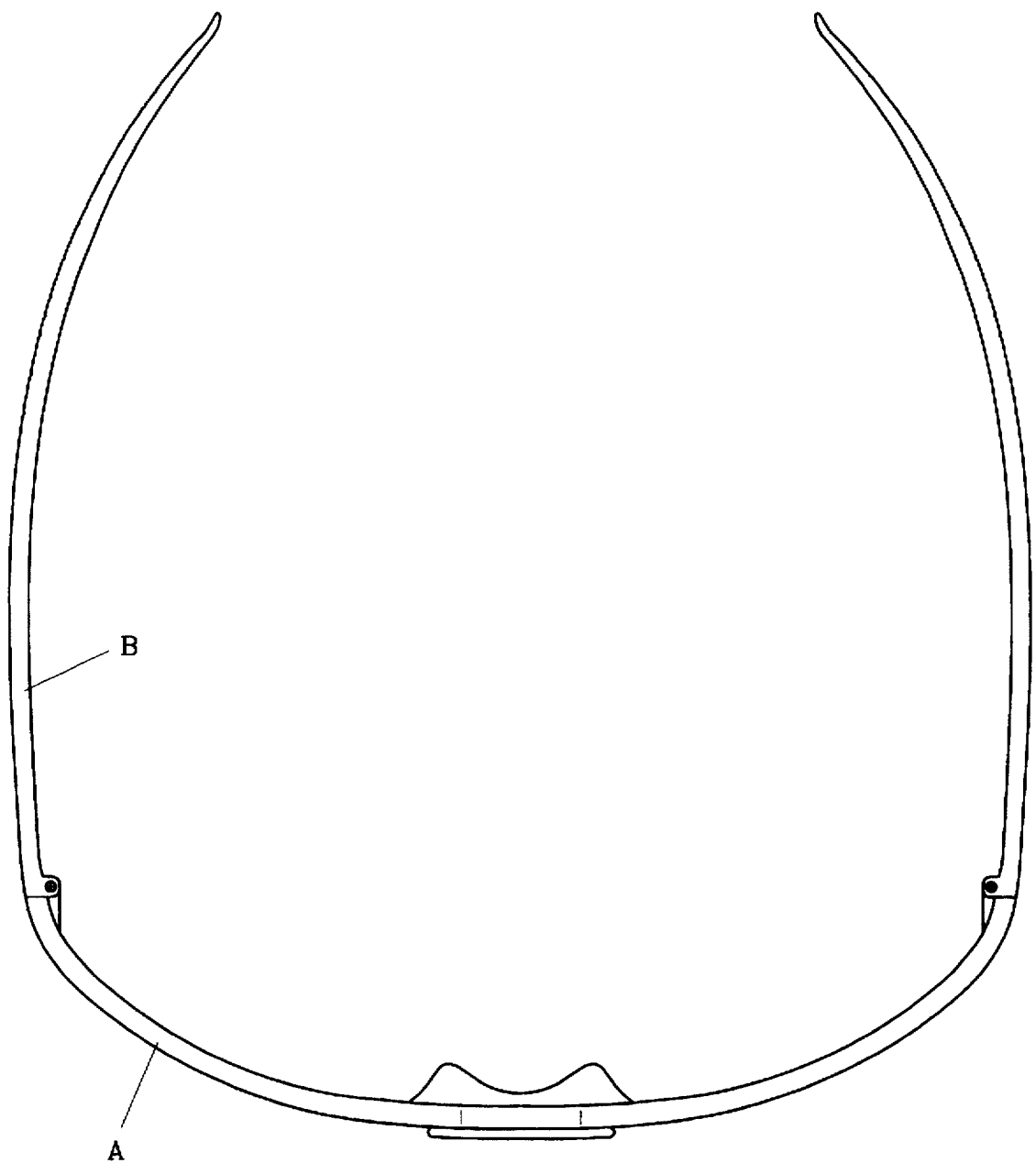
FIG. 1 is an upper view of a known conventional eyeglasses in the present invention.
Figure 2:
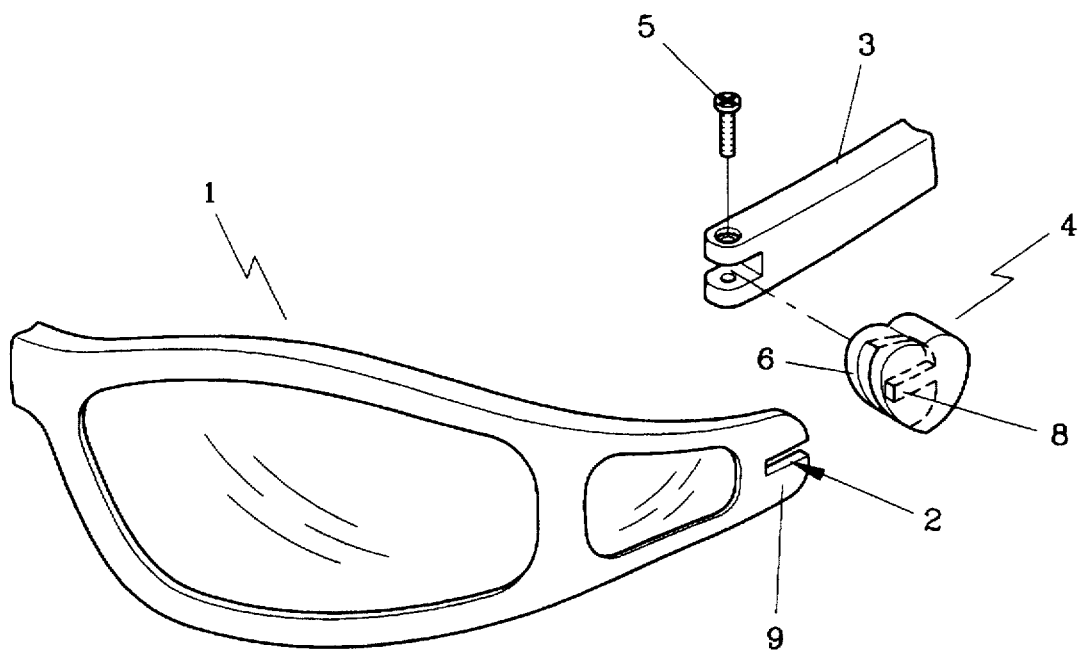
FIG. 2 is an exploded perspective view of a first preferred embodiment of eyeglasses frame in the present invention.
Figure 3:
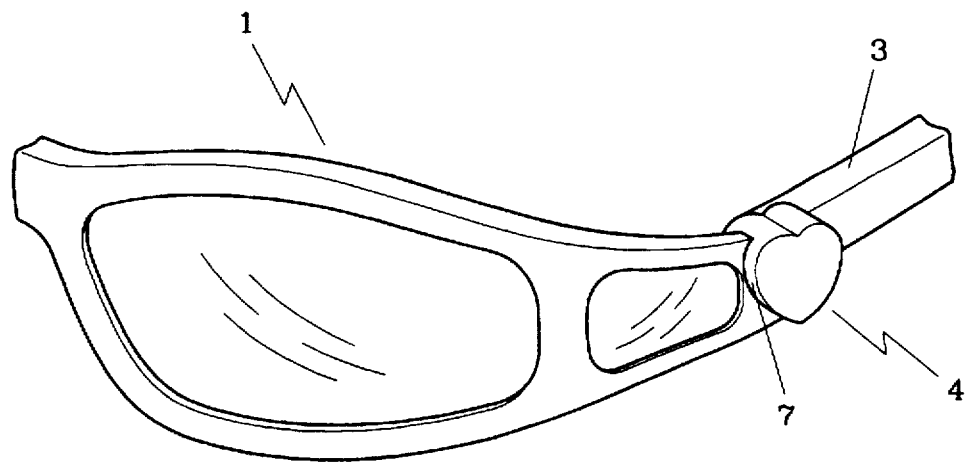
FIG. 3 is an perspective view of the first preferred embodiment of eyeglasses frame in the present invention.

A first Preferred embodiment of eyeglasses frame in the present invention, as shown in FIG. 2, includes a lens frame 1, two temples 3, 3 and two connecters 4, 4 combined together.

The lens frame 1 has one or more slots 2 respectively in two side ends.

The two temples 3, 3 respectively have a front end combined pivotally with a first connecter 4, as shown in FIGS. 5 and 6.

Figure 7:
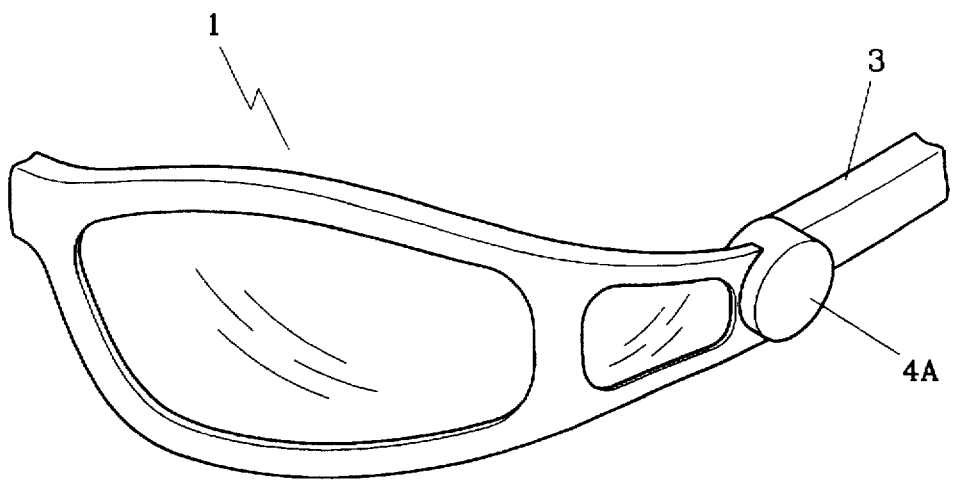
FIG. 7 is a perspective view of a second preferred embodiment of eyeglasses frame in the present invention.
Figure 8:
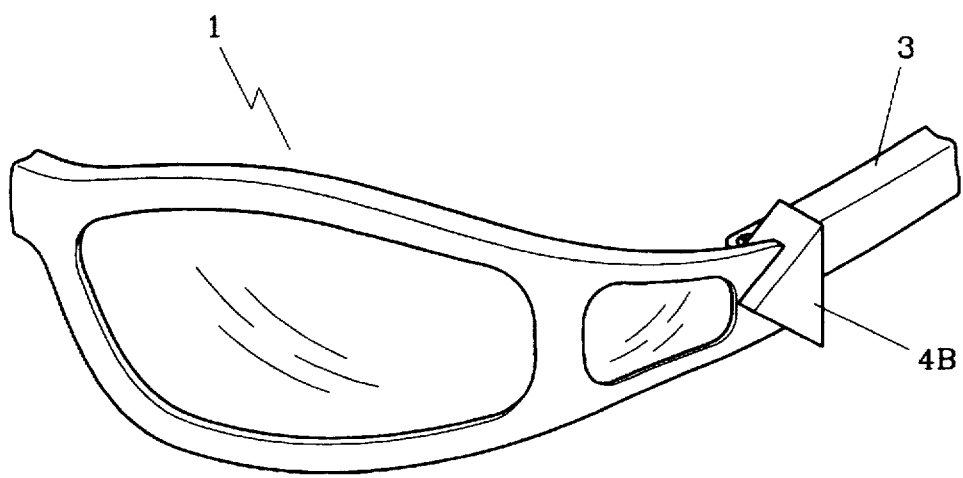
FIG. 8 is a perspective view of a third preferred embodiment of eyeglasses frame in the present invention.

The two connecters 4, 4 respectively have a heart shape in the first preferred embodiment as shown in FIGS. 2, a round shape in a second preferred embodiment in FIG. 7 and a triangular shape in a third preferred embodiment in FIG. 8, but can be of any shape so long as it has a decorative effect. Each first connecter 4 has two parallel walls 6 and 7 connected with a small intermediate wall 8. The small intermediate wall 8 has the same length as the slot 2 of the lens frame 1 so as to fit just in the slot 2. Then the two opposite walls 6 and 7 clamp firmly a side end wall 9 of the lens frame 1 to let the connecter 4 combined with the lens frame 1 securely without possibility of separating from the lens frame. The two connecters 4, 4 are very easy to combine the temples 3 with the lens frame 1, so the lens frame 1 and the temples 3 may be altered quite easily so as to alter an outer appearance of an eyeglasses.

Figure 9:
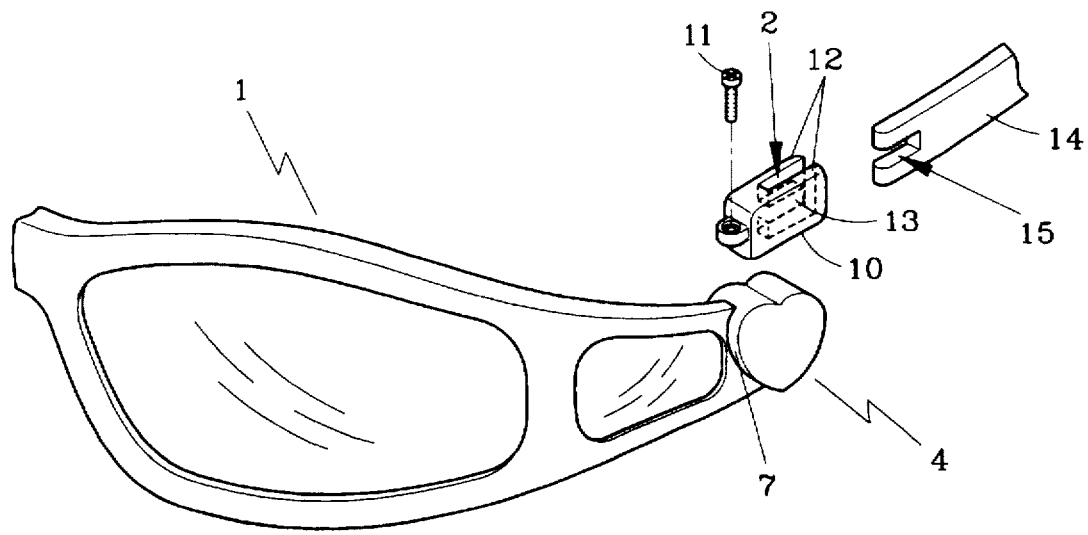
FIG. 9 is an exploded perspective view of a fourth preferred embodiment of eyeglasses frame in the present invention.
Figure 10:
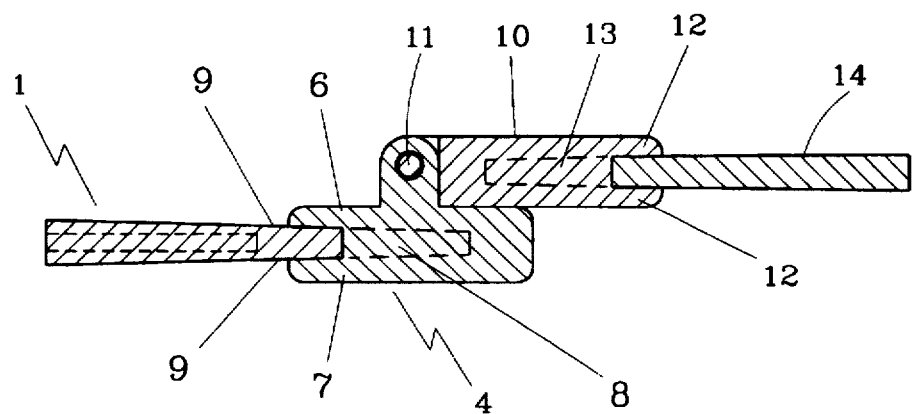
FIG. 10 is a cross-sectional view of the fourth preferred embodiment of eyeglasses frame in the present invention.

A fourth preferred embodiment of eyeglasses in the present invention, as shown in FIGS. 9 and 10, has the same structure as the first, the second and the third preferred embodiment but a second connecter 10 is additionally provided to be combined with the first connecter 4 by means of a screw 11, having two parallel walls 12, 12, a gap defined by the two walls 12, 12, and a small intermediate wall 13 connecting the two walls 12, 12. Two temples 30, 30 respectively have a slot 15 in a front end to fit firmly with the small wall 13 of the second connecter 10. Then the fourth eyeglasses also has the same effect in altering the lens frame and the temples with easiness.

Figure 11:
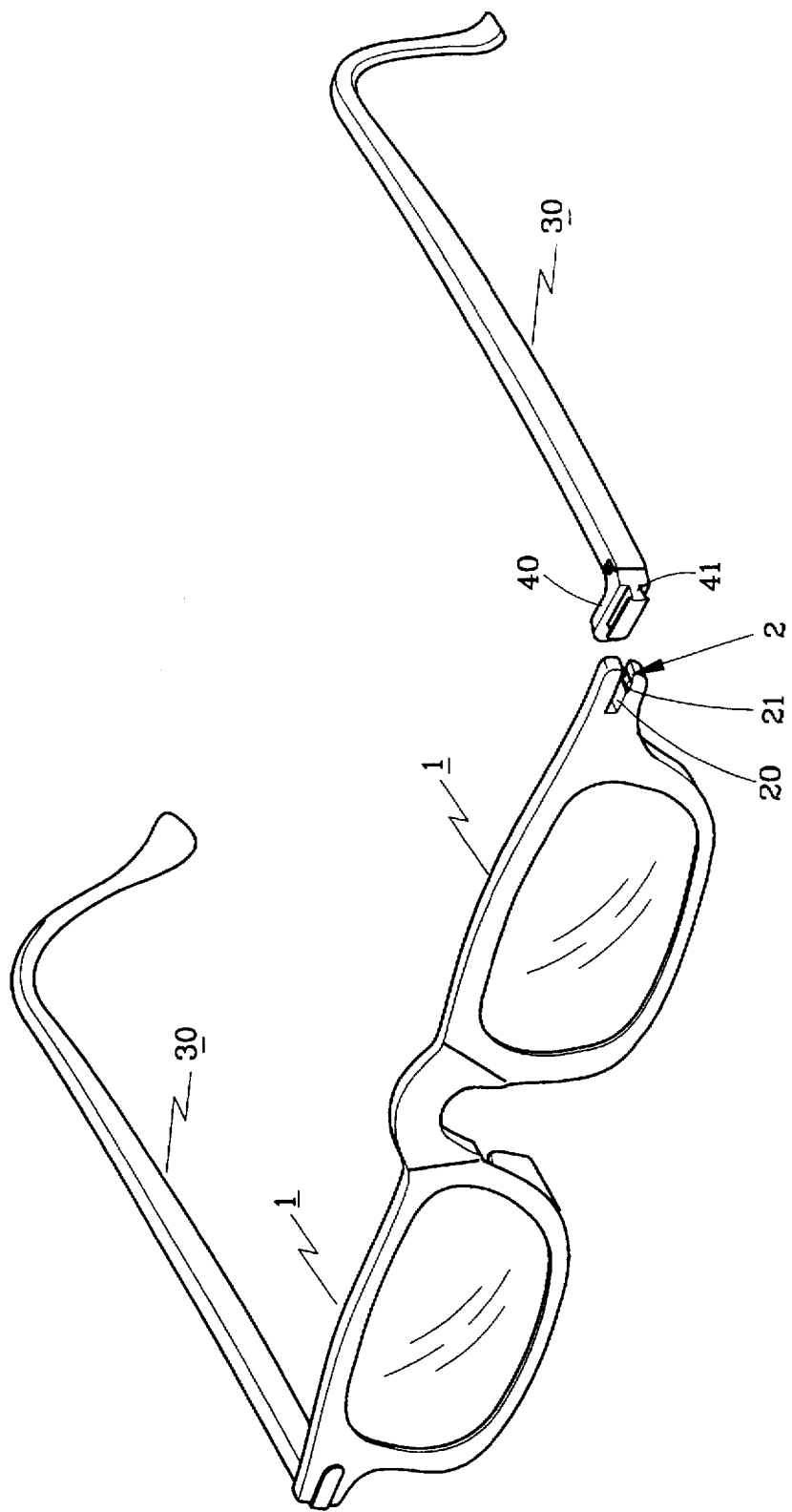
FIG. 11 is a fifth preferred embodiment of eyeglasses in the present invention.
Figure 12:
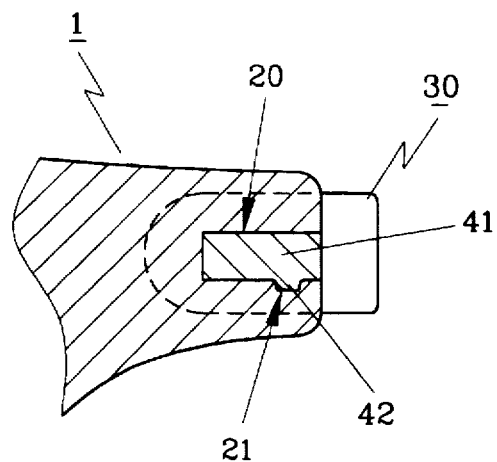
FIG. 12 is a part cross-sectional view of the fifth preferred embodiment of eyeglasses frame in the present invention; and, FIG. 13 is another part cross-sectional view of the fifth preferred embodiment of eyeglasses frame in the present invention.
Figure 13:
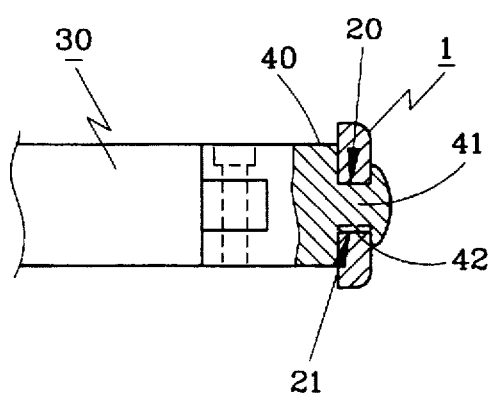

A fifth preferred embodiment of eyeglasses in the invention is shown in FIGS. 11, 12 and 13, including a lens frame 1 provided with a slot 2 respectively at two side ends. Either an upper or lower wall 20 of the slot 2 has an engage groove 21. A connecter 40 has a connect wall 41, and a projecting ridge 42 on the connect wall 40 in the corresponding location of the engage groove 21 of the lens frame 1. Then the connecter 40 is assembled with the lens frame 1, with the projecting ridge 42 engaging with the engage groove 21, combining the connecter 40 with the lens frame securely. Then the connecter 40 is easy to move in the lens frame 1 but hard to move out, convenient for changing the lens frame and the temples.

While the preferred embodiments of the invention have been described above, it will be recognized and understood that various modifications may be made therein and the appended claims are intended to cover all such modifications which may fall within the spirit and scope of the invention.

What is claimed is:

1. Eyeglasses including connecting means having a desirable shape for a decorative effect for changing the outer appearance of the eyeglasses, comprising a lens frame having two side ends, a slot formed at each of said side ends, two temples each having a front end, a slot formed at the front end, said connecting means for connecting the respective temples to said lens frame, including first connecting means, second connecting means and hinge means wherein said hinge means being pivotally connected between said first connecting means and said second connecting means.

said first connecting means comprising two first parallel walls connected with a first intermediate wall to form a gap therebetween for firmly fitting to the slot at the front end of the respective temple, said second connecting means comprising two second parallel walls connected with a second intermediate wall to form a gap therebetween for firmly fitting to the slot at the side end of said lens frame so as permitting the lens frame and the two temples changeable with another ones.

\* \* \* \* \*